June 22, 1926.
C. A. VALENTINE
Re. 16,367
COMPOUND RESONATOR
Original Filed Nov. 23, 1916 2 Sheets-Sheet 1
Fig. 1.
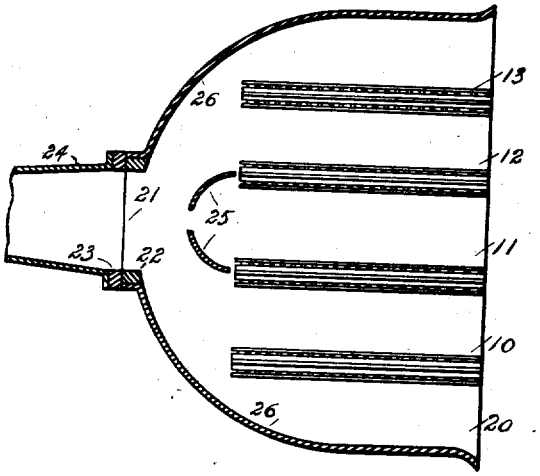
Fig. 2.
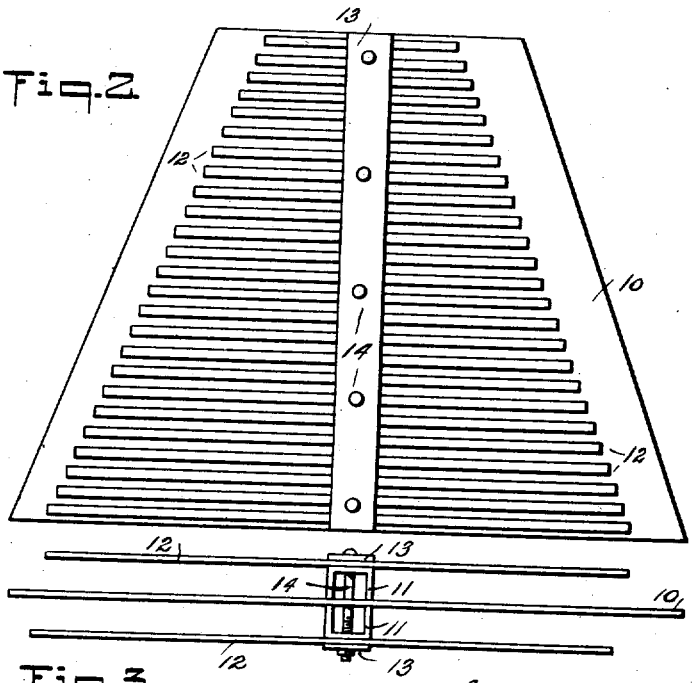
Fig. 3.
INVENTOR
Charles A. Valentine,
BY
Fraser, Fuller & Hughes
ATTORNEYS June 22, 1926.

C. A. VALENTINE

Re. 16,367

COMPOUND RESONATOR

Original Filed Nov. 23, 1916 2 Sheets-Sheet 2

INVENTOR

Charles A. Valentine,

BY

Fraser, Turk & Musser

ATTORNEYS

Patented June 22, 1926.

Re. 16,367

UNITED STATES PATENT OFFICE.

CHARLES A. VALENTINE, OF YONKERS, NEW YORK.

COMPOUND RESONATOR.

Original No. 1,282,500, dated October 22, 1918, Serial No. 132,961, filed November 25, 1916. Application for reissue filed October 21, 1920. Serial No. 418,605.

My invention relates to improvements in compound resonators, and its object is to provide a simple and efficient device which is extremely responsive to sound vibrations, which is capable of effectively augmenting such vibrations, and which is adapted to clarify the tones or sounds emitted, separating such tones or sounds in such manner as to secure a great degree of distinctness without loss of tonal values.

The invention is particularly directed to talking machines or phonographs, or other devices employing diaphragmatic action, but may be used in connection with other devices where it is desirable to clarify and augment the emitted tones.

In order that my invention may be thoroughly understood, I will now proceed to describe the same in the following specification, and then point out the novel features thereof in appended claims.

Referring to the drawings:

Figure 1 is a sectional side elevation of an amplifying horn, provided with a plurality of compound resonators, which are made according to and embodying my invention.

Fig. 2 is a plan view, and Fig. 3 a front elevation of one of the compound resonators shown in Fig. 1.

Figure 4:
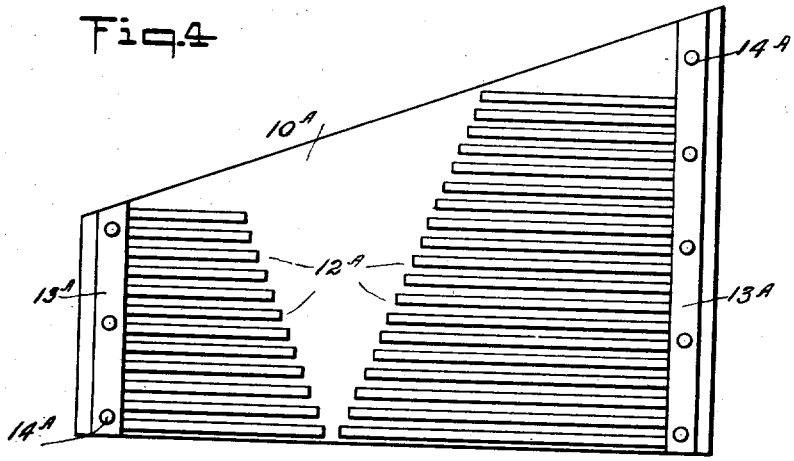

In Fig. 4, I have shown, in plan view, a modified form of resonator, which also embodies my invention.

Figure 5:
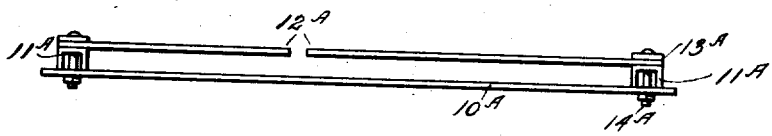

Fig. 5 is a front elevation of the form of resonator which is shown in Fig. 4.

Figure 6:
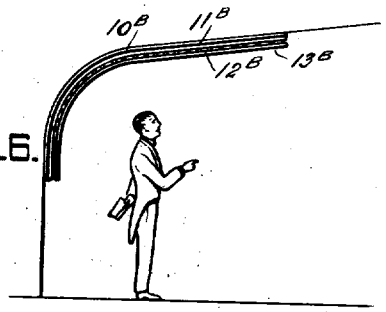

Fig. 6 is a sectional side elevation of another form of resonator, which is also made according to this invention.

Figure 7:
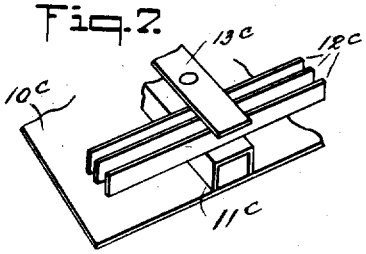

Fig. 7 is a perspective view of another modification of construction, and

Figure 8:
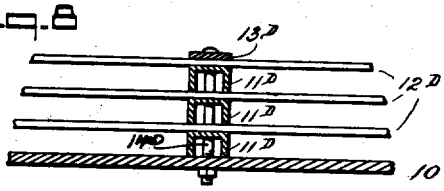

Fig. 8 is a sectional front elevation of a still further modified structure, embodying the same invention.

Like characters of reference designate corresponding parts in all the figures.

10 designates a flat board of thin wood, or other vibrating material, upon which the other parts of the apparatus are mounted. 11 are supporting bridges, which, in the structure shown in Figs. 1, 2 and 3, run longitudinally across the center of the board 10, on opposite sides thereof. Across the outer surfaces of these bridges, and disposed transversely in relation therewith, are a plurality of parallel vibrators 12. Outside of these, are clamping strips 13, and all of these parts are held together rigidly by through bolts 14.

The vibrators 12 are preferably constructed of thin strips of material sensitive to sound vibrations, such for example, a wood carefully seasoned and prepared for this purpose. These are of different dimensions so as to be responsive each to vibrations of different frequencies. A convenient means for attaining this result is to make them of different lengths, and to offset them centrally on the bridges.

In Fig. 1, four of these improved compound resonators are shown in an amplifying horn, or resonance chamber 20, of a form suitable for use in conjunction with a phonograph or talking machine. At the smaller end of this horn is an inlet opening 21, surrounded by a wooden frame 22, by means of which the horn may be affixed to a similar frame 23 at the mouth of an adapter 24, the other end of which may be affixed to the sound emitting opening of a phonograph or talking machine (not shown).

The sound vibrations pass through an opening between two deflectors 25, but some of them are deflected to the curved surfaces 26 of the horn, which reflect them so that they pass out through the mouth of the horn. Thus, the sound vibrations pass through different paths through the horn, so that a plurality of my sounding boards may be used to advantage with such a horn.

This construction, however, may be widely varied, without departing from the invention.

I have found, in practice, that carefully seasoned wood secures, by far, the best results of any materials with which I am acquainted. They introduce no deleterious vibrations of their own, and are singularly responsive to the impressed vibrations.

The operation of the device may be understood from the foregoing description. The vibrators 12 are each responsive to one frequency, and probably at least some of them are independently responsive to different frequencies. When the device is placed in the path of musical or other sounds, the vibrators are set in motion thereby, and tend to lengthen, sustain and augment the vibrations of the impressed sound waves. There is also a very notable clarifying effect, particularly in the case of the talking machine or other similar devices, the various vibrations produced at the diaphragm being clarified to such an extent that there is a very marked improvement in the clearness of tone emitted and the elimination of the jumbling or confusion of sounds produced at the diaphragm, or between the diaphragm and the vibrators, due to diaphragmatic or other action setting up spurious or added vibrations not present in the original production.

The mounting of the vibrators upon a sounding board, such as the base board 10, is of importance, since this not only augments the volume of sound, but also aids in its clarification. It is also important that the vibrators should have a rigid connection with the sounding board of base board, and that the vibrators, individually, should be rigidly connected thereto.

By mounting a series of resonators of different dimensions or differently tuned upon a sounding board or its equivalent in the path of the sound vibrations, all of the resonators become more sensitive to the vibrations, and they and the sounding board produce a series of overtones which supply the loss of overtones which occurs through present methods of reproducing.

As the vibrators are tuned to definite periods of vibrations, preferably all within the range of audibility, there is another important function performed by them, in that certain undesirable irregular vibrations, such as those produced by the scratch of a phonograph needle, are not augmented, so that, in effect, they are proportionately reduced or eliminated.

In the structure shown in Figs. 4 and 5, $10^a$ designates the base board. In this case, the bridges $11^a$ are set along the opposite edges of the board. The vibrators $12^a$ are secured to the bridges by means of clamping strips $13^a$ and through bolts $14^a$, as in the previously described construction, but in this case, each is secured near one of its ends, so that a separate piece is required for each vibrator.

The operation of this embodiment of my invention is so similar to that previously described, that it would be superfluous to repeat a description of it.

It is obvious that the base board need not be plane, but that my invention is applicable to a parabolic or curved sounding board such as that shown at $10^b$ in Fig. 6. In this case, the bridge $11^b$, and the clamping strip $13^b$ are curved to conform with the shape of the base board $10^b$. The vibrators in this figure are designated $12^b$.

In the structure shown in Fig. 7, the base board $10^c$ is plane, and the bridge $11^c$ is placed across its surface. The vibrators $12^c$ are held between the bridge and the clamping strip $13^c$, but, in this case, they are placed edgewise with relation to the board $10^c$, instead of flatwise, as in other cases. These vibrators have much the same operation as that described in connection with the structure of Figs. 1, 2 and 3.

In the structure of Fig. 8, a plurality of rows of parallel vibrators $12^d$ are shown between bridges $11^d$ and clamping strip $13^d$, held together and to base board $10^d$ by through bolts $14^d$.

I have illustrated and described several structures embodying my invention, to show that it is not limited to any specific construction or use, but that it is in fact capable of wide variation within its spirit and scope. In fact, I intend no limitations other than those imposed by the appended claims.

It is an important, although not essential, feature of the invention, that each of the vibrators be made as an independent unit, so that it may be capable of vibrating freely, without necessarily involving the vibration of others.

What I claim is:—

1. A device for reproducing sounds, having a chamber adapted to receive sound waves set up by a diaphragm and a base board and wooden vibrators connected with said base board and mounted in said chamber to be acted upon by such sound waves.

2. A device for reproducing sounds, having a chamber adapted to receive sound waves set up by a diaphragm, means for leading said sound waves to said chamber, and flat vibrators arranged in said sound chamber and mounted in the path of said sound waves.

3. A device for reproducing sounds, having a chamber adapted to receive sound waves set up by a diaphragm, means for leading said sound waves to said chamber, and flat vibrators arranged in said sound chamber and mounted in the path of said sound waves, and a sounding board upon which said vibrators are mounted.

In witness whereof, I have hereunto signed my name.

CHARLES A. VALENTINE.